(12) United States Patent
Schmuck et al.

(10) Patent No.: US 7,337,973 B2
(45) Date of Patent: Mar. 4, 2008

(54) IDENTITY CARD

(75) Inventors: Arno Schmuck, Leverkusen (DE); Markus Geiger, Cologne (DE); Leo Vermeulen, Herenthout (BE)

(73) Assignee: OpCo GmbH (DE)

( * ) Notice: Subject to any disclaimer, the term of this patent is extended or adjusted under 35 U.S.C. 154(b) by 0 days.

(21) Appl. No.: 10/620,658

(22) Filed: Jul. 16, 2003

(65) Prior Publication Data

US 2004/0041032 A1    Mar. 4, 2004

(30) Foreign Application Priority Data

Jul. 18, 2002    (DE) ................ 102 32 568

(51) Int. Cl.
    *G06K 19/02* (2006.01)
(52) U.S. Cl. ............ 235/488; 235/380; 235/492; 235/451
(58) Field of Classification Search ........ 235/488, 235/380, 487, 492, 457, 451; 283/107, 109
    See application file for complete search history.

(56) References Cited

U.S. PATENT DOCUMENTS

| | | | |
|---|---|---|---|
| 4,457,798 A | | 7/1984 | Hoppe et al. |
| 4,855,583 A | * | 8/1989 | Fraser et al. ............... 235/492 |
| 4,992,353 A | * | 2/1991 | Rodakis et al. ............. 430/213 |
| 5,410,642 A | * | 4/1995 | Hakamatsuka et al. .... 358/1.14 |
| 5,842,722 A | * | 12/1998 | Carlson ...................... 283/107 |
| 5,888,624 A | * | 3/1999 | Haghiri et al. ........... 428/195.1 |
| 5,985,457 A | * | 11/1999 | Clifford ...................... 428/416 |
| 6,002,383 A | * | 12/1999 | Shimada ...................... 345/87 |
| 6,170,880 B1 | * | 1/2001 | Prancz ........................ 283/86 |
| 6,390,375 B2 | * | 5/2002 | Kayanakis .................. 235/492 |
| 6,406,935 B2 | * | 6/2002 | Kayanakis et al. ......... 438/106 |
| 6,497,371 B2 | * | 12/2002 | Kayanakis et al. ......... 235/492 |
| 6,554,193 B1 | * | 4/2003 | Fehrman et al. ............ 235/488 |
| 6,623,039 B2 | * | 9/2003 | Thompson et al. .......... 283/61 |
| 6,786,419 B2 | * | 9/2004 | Kayanakis .................. 235/492 |
| 6,830,192 B1 | * | 12/2004 | Krul et al. .................. 235/492 |
| 6,843,422 B2 | * | 1/2005 | Jones et al. ................. 235/492 |
| 2002/0022143 A1 | * | 2/2002 | Ludwig et al. ............. 428/513 |
| 2003/0178495 A1 | * | 9/2003 | Jones et al. ................. 235/492 |
| 2005/0040243 A1 | * | 2/2005 | Bi et al. ..................... 235/492 |

FOREIGN PATENT DOCUMENTS

| | | |
|---|---|---|
| DE | 29 20 012 | 11/1980 |
| DE | 30 29 939 | 3/1982 |

(Continued)

OTHER PUBLICATIONS

IX.C of Research Disclosure 38957, 1996.

Primary Examiner—Thien M. Le
Assistant Examiner—Edwyn Labaze
(74) Attorney, Agent, or Firm—Connolly Bove Lodge & Hutz LLP

(57) ABSTRACT

A card with a paper core and at least one chip incorporated into the paper core, characterised in that an image is arranged on at least one main surface of the paper core, at least 5% of at least one main surface are covered by a seal and the chip is covered on both main surfaces with a seal or a plastics layer, is distinguished by elevated anti-counterfeiting security, very good durability and elevated flexibility.

15 Claims, 1 Drawing Sheet

FOREIGN PATENT DOCUMENTS

| | | |
|---|---|---|
| DE | 42 11 459 | 10/1993 |
| DE | 42 18 158 | 12/1993 |
| DE | 198 17 105 | 10/1999 |
| EP | 0 340 512 | 11/1989 |
| EP | 0 440 957 | 8/1991 |
| EP | 0 913 268 A1 | 5/1999 |
| JP | 2002373323 A * | 12/2002 |
| JP | 2003085510 A * | 3/2003 |
| JP | 2003187211 A * | 7/2003 |
| WO | WO 86/02047 | 4/1986 |

* cited by examiner

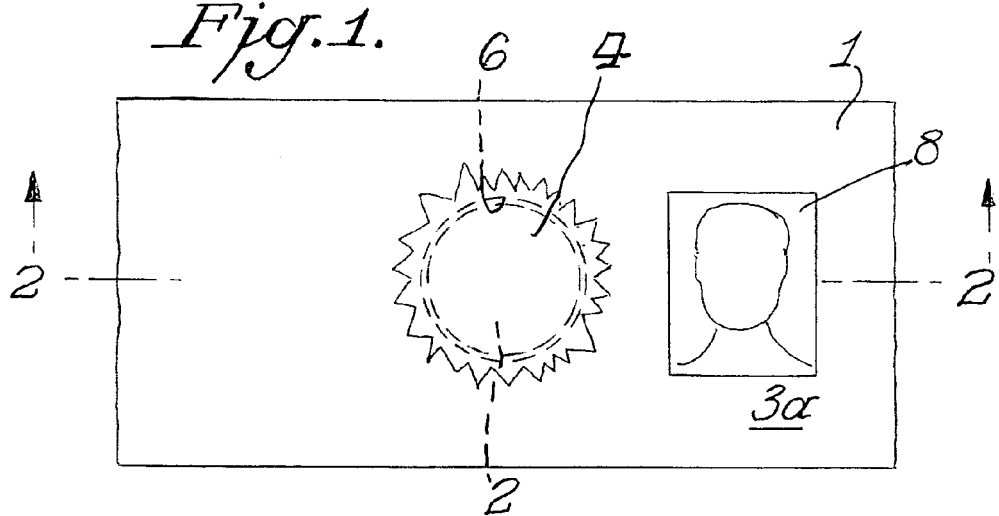
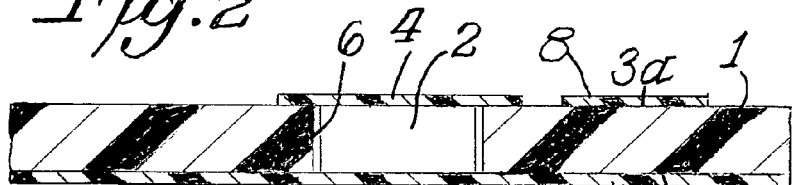
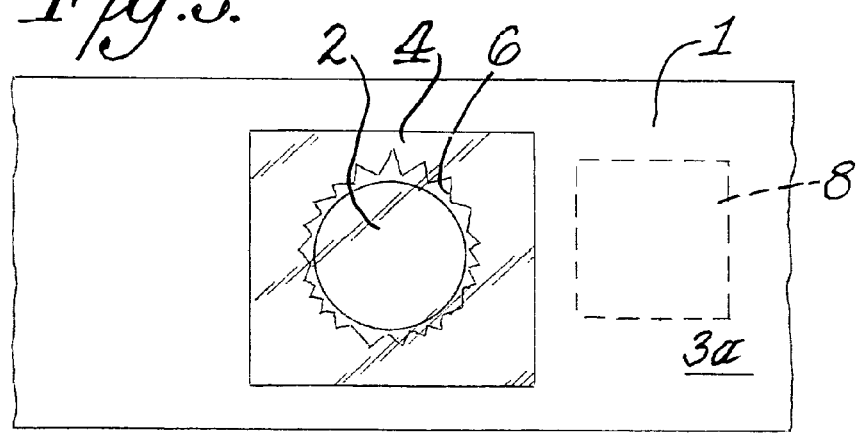
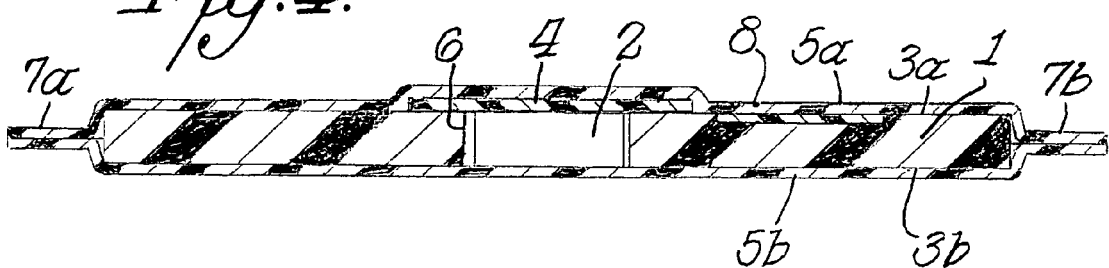

IDENTITY CARD

BACKGROUND OF THE INVENTION

Card comprising a paper core and at least one chip incorporated into the paper core and a process for the production thereof.

It is known to produce cards which contain an electronically readable and/or writable chip. Such cards, also known as identity cards, are frequently printed, are used as payment or telephone cards and are usually produced from plastics such as for example PVC, PET or ABS. The chip comprises a digital memory component, the storage capacity of which may vary, and which may be read and/or written either via contacts brought out to the surface of the card or in contactless manner, for example via a coil.

Chips which are suitable for both the contactless variant and that comprising contacts are commercially available. However, cards made from plastics cannot be provided with high quality print and films laminated thereon can be exchanged without leaving visible traces. As a consequence, plastics cards may only insufficiently be protected against tampering with the chip.

It is known from DE 42 18 158 to coat a plastics card with photographic layers. However, the process required for this purpose, in which the photosensitive layers of a photographic material must be peeled off from the support thereof, is highly complex.

Moreover, the stiffness of plastics cards is unpleasant for the user.

A card is described as known in DE 29 20 012 which comprises a unit consisting of a chip with support element, supply lines and external contact surfaces, wherein the unit is rigidly connected with the card. Due to the severe bending loads to which the unit is exposed, this structure is considered unsuitable for practical requirements.

The card according to the invention of DE 29 20 012 differs from the rigid structure in that the unit consisting of chip plus support element is accommodated in a cut-out which is somewhat larger than the unit and the unit is moreover retained in the cutout by a resilient material. The cut-out is intended to be similar in outline to the support element. Preferably, the chip plus support element and contact surfaces is held in the window by cover films laminated onto both sides, wherein the cover film must have punched out portions over the contact surfaces. In order to avoid damaging the chip, which, via the contact surfaces, is in direct thermal contact with the cover films, only cold lamination can be used to apply the films. Films laminated in this manner may, however, be more readily detached than hot-laminated films. In addition, according to DE 29 20 012, the cover films must be stiff, so resulting in unpleasantly rigid cards.

U.S. Pat. No. 4,457,798 discloses a process which involves treating the card inlay at one point in such a manner that a subsequently hot-laminated film does not adhere at this point. This point is then punched out in such a manner that the film remains undamaged and the chip module is inserted and firmly adhered in the resultant indentation. While the process does indeed make it possible to hot-laminate films onto the card inlay, the chip and the contact surfaces are, however, inadequately protected. In addition, residual release agent frequently results in detachment of the cover film and the process is highly elaborate.

The identity cards described in DE 30 299 39 contain an IC component plus support element and connection lines, which component is laminated into the card composite and is bonded with the card on all sides and over its entire surface. In order to make it possible to use hot lamination for this purpose without destroying the chip, the latter must be protected by buffer zones.

While the resultant identity cards do indeed exhibit resistant cover layers, anti-counterfeiting security is still unsatisfactory. In particular, print quality is inadequate.

Known cards do not meet the elevated anti-counterfeiting security requirements of identity cards. For example, the cover films may too easily be removed without damaging the card body, so making it possible to tamper with the chip and other security features and too few different security features are possible.

A further disadvantage of known cards is the inadequate durability thereof, which results in detachment of the cover layer after some time, so in turn permitting tampering. In particular, it is then no longer possible to tell whether the card has been tampered with or has simply been exposed to particularly severe use.

Furthermore, prior art cards are very stiff, contacts brought to the surface are readily worn away and manufacture is very elaborate and thus costly.

SUMMARY OF THE INVENTION

The object of the invention was accordingly to eliminate the stated disadvantages. Surprisingly, this is achieved with a card which comprises a paper core with an image and is provided with a seal.

The present invention accordingly provides a card with a paper core and at least one chip incorporated into the paper core, characterised in that an image is arranged on at least one main surface of the paper core, at least 5% of at least one main surface are covered by a seal and the chip is covered on both main surfaces with a seal or a plastics layer.

BRIEF DESCRIPTION OF THE DRAWINGS

Novel features and advantages of the present invention in addition to those mentioned above will be readily apparent to persons of ordinary skill in the art from a reading of the following detailed description in conjunction with the accompanying drawings wherein similar reference characters refer to similar parts and in which:

FIG. 1 is a top plan view of an identity card, according to the present invention;

FIG. 2 is a sectional view taken along line 2-2 of FIG. 1;

FIG. 3 is a top plan view of an alternative identity card, according to the present invention; and FIG. 4 is a sectional view of still another alternative identity card, according to the present invention, similar to FIG. 2, but illustrating a top plastic layer 5a along with the bottom layer 5b.

DETAILED DESCRIPTION OF THE INVENTION

FIGS. 1 and 2 illustrate a card according to the present invention comprising a paper core 1 with an image 8 arranged on one main surface of the paper core and with at least one chip 2 incorporated into the core. At least 5% of at least one surface 3a and/or 3b is covered by a seal 4. The chip 2 is covered on both main surfaces with the seal 4 and a bottom plastic layer 5. The seal 4 preferably exhibits fine structure, as shown.

FIG. 3 illustrates an alternative card and similar reference characters have been used to identify similar parts. The major difference is that the recess 6 exhibits the fine structure instead of the seal 4.

FIG. 4 shows a card similar to the embodiments of FIGS. 1-3, but the card is covered on the top and bottom surface 3a and 3b with plastic layers 5a and 5b. These layers project beyond the outer edges of the card, and the projecting margins 7a and 7b of the two layers are welded together.

A card should be taken to mean a three-dimensional article, in which two sides occupy a substantially larger area than the other sides. Examples of such cards are telephone cards, credit cards, parking cards or identity cards. The two sides having the larger area are denoted the main sides or main surfaces of the card and the sides with the smaller areas the edges or margins. The dimensions of a card are rigidly standardised for many applications and may otherwise be selected at will. Although standardised cards are usually rectangular, they may also be of a different shape, such as for example square, round, hexagonal etc.

According to the invention, an image is any kind of reproduction, i.e. also of text and patterns. The reproduction may be coloured, black & white, invisible or a combination thereof. Invisible reproductions may be rendered visible by infrared and/or UV light.

For the purposes of the invention, a paper core should be taken to comprise any paper-based material capable of bearing an image. It may comprise paper itself, in particular high quality paper, but is preferably a coated paper. The coating may be present on one side or both sides and, in the case of coating on both sides, the main surfaces may mutually independently bear one or more layers, which may also be different. A coating should be taken to mean one or more layers.

The coating may either be applied directly, layer by layer, onto the paper, or it is also possible to apply a coated support, for example a coated film, onto the paper in order to produce the paper core.

Coating particularly preferably proceeds by the continuous flooding process, in which the layer or layers are poured as a solution or dispersion, in particular as an aqueous solution or dispersion, onto a support and then dried, wherein two or more layers are preferably applied in a one pass. In the case of flooding, in particular for two or more layers, cascade and curtain coaters are particularly suitable.

It is frequently preferred to provide the two main surfaces of the paper core with different coatings in order to be able to create a greater diversity of image information.

If particularly stringent requirements apply with regard to image quality, a plastics-coated paper is preferred over pure paper, in particular if it additionally comprises image-receiving and/or image-forming layers.

In an advantageous embodiment, a paper coated on both sides with plastics is used and a plastics material which is particularly suitable for this purpose is polyethylene.

The chip preferably comprises an integrated circuit on which information can be stored digitally, wherein the data may particularly preferably be read from and/or written to the chip in contactless manner. Among preferred contactless variants such as for example optical, capacitive or inductive data transfer, it is the inductively operated chips with a coil, in particular those known as "coil on chip", in which the coil is arranged directly on the chip, which have proved particularly advantageous for the cards according to the invention. This chip has proved to be particularly stable in particular in the case of hot lamination with plastics films. Suitable "coil on chip" products are for example RFID chips from Maxell in which the antenna coil is integrated on the chip.

The chip is located in a recess of the paper core, which recess is either the same size as or larger than the chip to be inserted.

The higher the quality of the image, the more difficult it is unnoticeably to peel off a seal or a plastics layer applied thereon. Even if the paper itself is not damaged, parts of the image remain stuck to the film and the card can no longer be stuck back down unnoticeably.

In an advantageous embodiment, the paper core accordingly comprises on at least one main surface at least one image-receiving layer which enables a particularly high quality image. Said layer preferably comprises a non-swellable, microporous layer or a swellable, in particular gelatine-containing layer, which is capable of particularly readily accepting ink, for example from inkjet printers. Preferred layers are furthermore those which readily accept toner, for example from laser printers. Other advantageous image-receiving layers are those which particularly readily accept printing inks, for example those for screen printing, offset printing, intaglio and flexographic printing, which are particularly good receiving layers for thermal sublimation printing, thermal transfer printing or the silver salt diffusion process.

In a further advantageous embodiment, the paper core comprises on at least one side at least one image-forming layer which contains a photosensitive or heat-sensitive silver salt emulsion or precursor substances for the thermoautochrome process or microcapsules, for example for cylithography. The layer preferably here comprises a photographic layer which contains a photosensitive silver halide emulsion. In this case, when the card is being produced, the photosensitive paper core is exposed with the image and processed in a manner corresponding to its type to form a black & white or colour image. In the case of a photographic layer, the image can only be monochrome, while in the case of two or more layers yielding different colours, multicolour images are also possible.

The photosensitive or heat-sensitive silver salt emulsion, the precursor substances for the thermoautochrome process or the microcapsules may also be incorporated directly in the paper.

The paper core used particularly preferably comprises a colour photographic paper, in which the paper core, in particular plastics-coated on both sides, used to produce the card comprises at least one blue-sensitive, yellow-coupling silver halide emulsion layer, at least one green-sensitive, magenta-coupling silver halide emulsion layer and at least one red-sensitive, cyan-coupling silver halide emulsion layer and the finished card contains an image produced with these photographic layers.

Particularly advantageous cards according to the invention contain, for example, paper cores which comprise photographic layers on both sides, or which comprise a photographic layer on one main surface and an image-receiving layer on the other.

If only one of the main surfaces of the paper core is provided with a swellable, gelatine-containing, image-receiving or image-forming layer, it may be advantageous to apply onto the reverse side a "non-curling" layer which counteracts unwanted bending. Said layer may preferably comprise an image-receiving gelatine-containing layer. The non-curling layer is particularly preferred for paper cores which are colour photographically coated on one side.

It has proved advantageous to provide the card with at least one antistatic layer, as read and write operations proceed substantially more reliably as a result. In unfavourable cases, the data on the chip or even the chip itself may be destroyed in the absence of an antistatic layer. Suitable antistatic additives are described, for example, in part IX.C of Research Disclosure 38957, 1996.

Permanent, polythiophene-based antistatic layers, as are for example described in EP 340 512, EP 440 957 and DE 4 211 459, are particularly preferred.

In an advantageous embodiment of the invention, the paper core used to produce the card permits a high-quality image with a resolution of at least 6 lines per mm, in particular of 8 lines per mm.

If the high quality image is, for example a portrait photograph of an individual, in particular a colour photograph, the card according to the invention is ideally suitable as an identity card.

The high quality image may also be located on a support which is applied onto the paper core. It may here comprise, for example, a printed film laminated onto the paper support.

In a preferred embodiment of the invention, the high quality image is located directly on the paper core and/or in the image-forming or image-receiving layer(s) thereof.

The seal may for example be colourless, coloured or printed, is preferably thinner than the paper core and advantageously consists of materials which can be processed to yield foils/films, such as for example metals or plastics, wherein plastics and in particular transparent materials are particularly advantageous. The seal itself may also contain security features, such as for example a hologram. By appropriate selection of the material or the coating thereof, it is possible to attenuate with the seal the sensitivity of the chip to data transmitted in contactless manner, in order for example to prevent unintentional addressing over long distances or due to interference signals. Plastics films with a vapour-deposited metal coating are particularly suitable for this purpose. The seal may be bonded to the paper core for example using cold or hot-melt adhesives, wherein pressure may also be applied. The seal is particularly preferably coated with a hot-melt adhesive and is bonded to the paper core with application of heat and pressure.

The seal preferably covers a security feature and/or the recess in which the chip is accommodated on at least one main surface and particularly preferably on both main surfaces.

In this manner, the security feature and/or the chip may be provided with particularly effective protection from tampering, in particular if the adhesion between the layers of the card is selected such that the adhesion between the seal and paper core is stronger than the cohesion within the paper core and/or stronger than the adhesion between the layers of the paper core. In this manner, the paper core and in particular the image arranged thereon is inevitably destroyed if the seal is removed.

A particularly advantageous seal is one which is at least 5% and in particular at least 40% smaller than the main surface of the card and which more preferably at no point on the main surface extends to the edge of the card. It consequently does not become detached so readily when exposed to flexural stress. In a particularly advantageous embodiment, the seal exhibits fine structures.

Particularly outstanding anti-counterfeiting security is achieved with a card, the paper core of which contains at least one recess with fine structures, in particular if the recess is covered with the seal on at least one side, still better on both sides. It is particularly advantageous here if the chip is accommodated in such a recess.

The fine structures in the core may, for example, be produced by punching a correspondingly structured recess through the entire core. Preferably, however, the core consists of two or more plies of films, wherein one or more of these films comprise recesses with fine structures. In the case of such a layer structure of the core, the fine structures are particularly preferably arranged in the outer films. The fine structures may be produced, instead of by punching, by any other method suitable for this purpose, for example also by cutting or by laser.

The punched out portions for the chip, which are conventionally adapted to the shape of the support element, i.e. are round or rectangular, do not ensure optimum protection from unauthorised peeling of the film. In contrast, in the case of punched out portions with fine structures, such peeling is immediately obvious as the structures are inevitably torn out.

In a further particularly advantageous embodiment of the invention, both the seal and at least one recess in the card core exhibit fine structures, wherein these elements in particular at least partially overlap.

Fine structures of the seal and the recess should be taken to mean, for example, "sawteeth" and/or narrow strips and/or small patterns, such as for example steps.

The sawteeth preferably have an acute angle of less than 90°, in particular of less than 60° and particularly preferably of less than 40° and the strips and the small patterns preferably have a thickness of less than 5 mm, in particular of less than 3 mm and particularly preferably of less than 2 mm.

In an advantageous embodiment, the entire edge length of the seal and/or of the recess is at least 20%, preferably at least 50% and particularly preferably at least 100% larger than in the case of a circular embodiment of identical area.

The seal and/or the recess is particularly preferably irregular, as a result of which it may act as a watermark if the card is held up against the light.

Further advantages with regard to the durability and anti-counterfeiting security of the card are obtained if the card is covered on at least one main surface at least over its entire area with a plastics layer and in particular when it is covered on both main surfaces with a plastics layer which projects beyond all the card's edges and these projecting margins of the two layers are welded together.

The plastics layer covering the entire area is particularly advantageously arranged over a seal which is smaller than the main surface.

In a further advantageous embodiment, the seal and the plastics layer covering the seal consist of different materials and/or the seal exhibits greater adhesion to the paper core than it does to the plastics layer arranged over the seal.

Both the seal and the plastics layers according to the invention may be provided with UV protection and comprise an image.

The cards according to the invention are preferably provided with further security features, such as for example a magnetic strip, signature strips, guilloche patterns, microprint, UV print, UV markers, holograms, kinegrams, laser images, watermarks, embossing, laser gravure, interference gratings, IR-readable symbols, thermochrome features, fluorescent pigments, release lacquers, predetermined breaking points and scoring in the plastics layers, the seal or the remaining security features.

IR-readable symbols may be produced in a particularly simple and high quality manner by means of a photographic layer if processing is controlled in such a manner that not all the silver is bleached. The metallic silver which remains in accordance with the image has very good IR readability.

An interference grating, which is preferably similar to that described in DE 198 17 105, may preferably be arranged on the front and reverse sides of a seal, on two seals covering a recess, on a seal and a plastics layer located thereover or on the front and reverse sides of a plastics layer. The interference grating comprises closely spaced superimposed grids of lines or other fine patterns which form a changing moiré pattern when the card is bent or flexed.

The release lacquers are capable of reducing the adhesion of localised areas of the main surface to the seal and/or a plastics layer and/or of reducing adhesion within the paper core in order to render uniform detachment of seal and/or plastics layer still more difficult.

The present invention also provides a process for the production of a card according to the invention, characterised in that an image is produced on the paper core, a recess for the chip is then created, the chip is inserted once the recess has been covered on one side with the seal and then the second side of the recess is covered with the seal or a plastics layer.

Production of the image is adapted to the above-described paper core variants according to the invention and may proceed, for example, by means of laser printers, inkjet printers, thermal sublimation printing, thermal printers or exposure with an image.

In addition to the advantages already described, the seal is also highly advantageous for the manufacturing process, in particular if it covers less than 50% of the main surface and does not extend to the edge of the card at any point. Since the smaller seal need not be exactly flush with the edges of the card, it may be applied much more simply and rapidly. In addition, if it is coated with a suitable adhesive, the seal can fix the chip and thus simplify subsequent manufacturing steps. Card production may consequently be automated straightforwardly.

Further preferred embodiments of the invention are disclosed in the claims.

The invention claimed is:

1. A card with a paper core and at least one chip incorporated into the core, characterized in that an image is arranged on at least one main surface of the paper core, at least 5% of at least one main surface is covered by a seal and the chip is covered on both main surfaces with the seal and a plastics layer, and wherein the adhesion between the seal and the paper core is stronger than the cohesion within the paper core and/or stronger than the adhesion between the layers of the paper core, and wherein the seal consists of plastics or metal.

2. The card according to claim 1, characterized in that the paper core comprises a plastics-coated paper.

3. The card according to claim 1, characterized in that the paper core comprises at least one image-receiving layer on at least one main surface.

4. The card according to claim 3, characterized in that the image-receiving layer comprises a microporous or gelatine-containing layer.

5. The card according to claim 1, characterized in that the paper core comprises at least one image-forming layer on at least one side.

6. The card according to claim 5, characterized in that the image-forming layer comprises a photographic layer.

7. The card according to claim 6, characterized in that the paper core and the image arranged thereon comprise an exposed and processed colour photographic paper.

8. The card according to claim 1, characterized in that the seal extends at no point to the edge of the card.

9. The card according to claim 1, characterized in that the seal covers the recess for the chip on at least one side.

10. The card according to claim 1, characterized in that the paper core contains at least one recess with fine structures.

11. The card according to claim 10, characterized in that the chip is accommodated in the recess.

12. The card according to claim 1, characterized in that the card is covered on at least one main surface at least over its entire area with a plastics layer.

13. The card according to claim 12, characterized in that the card is covered on both main surfaces with a plastics layer which projects beyond all the card's edges and the projecting margins of the two layers are welded together.

14. A process for the production of a card according to claim 1, characterized in that an image is produced on the paper core, a recess for the chip is then created, the chip is inserted once the recess has been covered on one side with the seal and then the second side of the recess is covered with the seal or a plastics layer.

15. The card according to claim 1, characterized in that the seal is at least 5% smaller than the main surface.

* * * * *